March 10, 1959

S. J. KORIENEK 2,876,757

AUXILIARY AIR METERING DEVICE FOR INTERNAL
COMBUSTION ENGINES
Filed Sept. 30, 1957

STEPHEN J. KORIENEK,
INVENTOR.

By Bernard J. Brown
ATTORNEY.

United States Patent Office 2,876,757
Patented Mar. 10, 1959

2,876,757

AUXILIARY AIR METERING DEVICE FOR INTERNAL COMBUSTION ENGINES

Stephen J. Korienek, Rosemead, Calif.

Application September 30, 1957, Serial No. 687,281

3 Claims. (Cl. 123—124)

This invention relates generally to intake systems for internal combustion engines; more particularly, it relates to apparatus for supplying auxiliary air to an internal combustion engine for improved operation.

Heretofore, internal combustion engines have conventionally been supplied with air for combustion only through carburetors wherein fuel is mixed with the air to form a combustible mixture which passes through a manifold to the combustion chambers. The carburetor adjustments maintain a substantially constant fuel-air ratio at all engine speeds and at all rates of acceleration or deceleration. It is well-known in the art that, for good performance and efficient fuel utilization, an internal combustion engine requires different fuel-air ratios for varying conditions of speed, acceleration, and deceleration. Fixed carburetor settings therefore result in relatively inefficient fuel-air mixtures at engine speeds other than the speed for which the carburetor is adjusted. The mixture is particularly inefficient during acceleration or deceleration. These inefficient ratios result in relatively poor performance, irregular or "rough" engine idling, the exhausting of excessive amounts of raw gasoline and unburned hydrocarbons, inefficient engine operation, relatively inefficient utilization of fuel, and in the deposition of excess carbon on the interior parts of the engine.

It is therefore, an object of the present invention to alleviate the foregoing disadvantages of the prior art by providing a novel auxiliary air metering device for internal combustion engines.

An object of this invention is to provide an air metering device for internal combustion engines which effects more efficient utilization of fuel.

It is an object of the present invention to provide an air metering device which substantially reduces the exhaustion by internal combustion engines of raw gasoline or incompletely oxidized hydrocarbons.

An object of the present invention is to provide an air metering device which effects a reduction in the deposition of carbon on interior parts of the engine.

It is an object of this invention to provide an air metering device which reduces the probability of "vapor-lock" in internal combustion engines, by cooling components wherein such "vapor-lock" is likely to occur.

It is an object of this invention to provide an air metering device which effects improved engine performance and more efficient engine operation at varying engine speeds and at varying rates of acceleration, and deceleration.

An object of this invention is to provide an engine air metering device which is simple to install and inexpensive to fabricate.

Other objects and features of the present invention, as well as many advantages thereof, will become apparent to those skilled in the art from a consideration of the following description, the appended claims, and the accompanying drawings in which:

Figure 1:
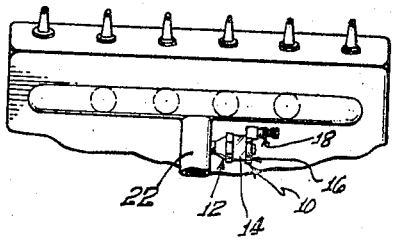
Figure 1 is an elevational view showing an auxiliary air metering device of the present invention mounted upon the intake manifold of an internal combustion engine.
Figure 2:
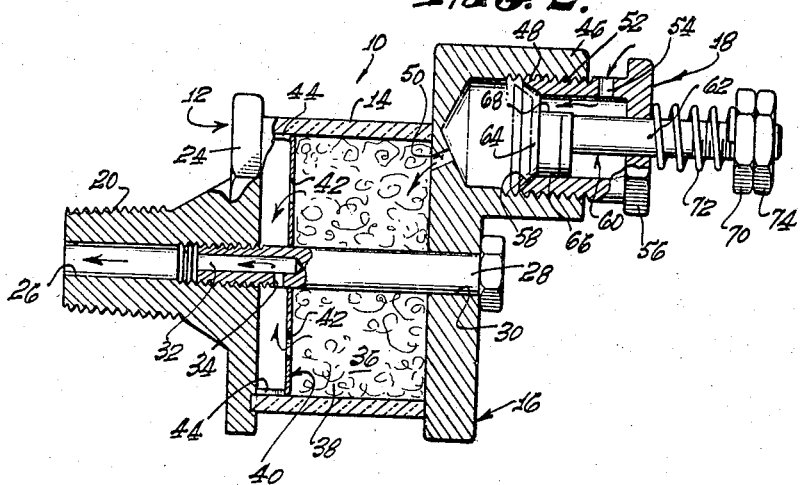
Figure 2 is an elevational view, partially in section, of an auxiliary air metering device according to the present invention.

Referring to the drawing, and particularly to Figures 1 and 2, there is illustrated a preferred embodiment of the auxiliary air metering device of the present invention. The metering device 10 includes a base 12, a transparent cylindrical wall member 14, a head member 16 and a valve fitting 18.

Base 12 has a slightly tapered end portion 20, which is threaded for engagement with a threaded opening (not shown) in an intake manifold 22 of an internal combustion engine. The base is adapted to be engaged by an installation tool, as by the provision thereon of an hexagonal flange 24. An axial bore 26 provides communication through the base, and is threaded along a portion of its length, as shown.

Figure 4:
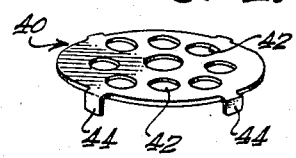
Figure 4 is a perspective view of a perforated spacing element utilized with the present invention.

The head member 16 and the wall member 14 are secured to base 12 by a bolt 28, which extends through an appropriate opening 30 in head member 16 and has an externally threaded end portion 30 for threaded engagement with axial opening 26 in the base. An axial opening 32 and a communicating transverse aperture 34 provide an air passage through the bolt and interconnect axial bore 26 with a chamber 36 defined by base 12, wall member 14 and head member 16. Within the chamber thus defined, there is provided a body of fibrous filtering material 38 which is preferably of corrosion-resistant material and which is preferably coated with a substance such as oil, to facilitate removal of particles from the air. The filtering material 38 is prevented from blocking aperture 34 by a spacing element 40, which is shown in Figure 4. The spacing element has a plurality of openings 42 to permit free passage of air. Leg portions 44 extend from the circular periphery of spacing element 40 and are perpendicular to its surface. These leg portions maintain the filtering material in spaced relation relative to base 12, as shown.

Formed integrally with head member 16 is a valve housing portion 46, which has an enlarged cylindrical threaded opening 48. A passage 50 provides communication between opening 48 and chamber 36.

Valve fitting 18 is secured to head member 16 by engagement of its threaded periphery 52 with opening 48. The fitting has an intake opening 54 and is provided with a tool engaging portion in the form of hexagonal portion 56 to facilitate assembly and dissassembly. A frustro-conical valve seat 58 is formed in the end of valve fitting 18, as shown.

Figure 3:
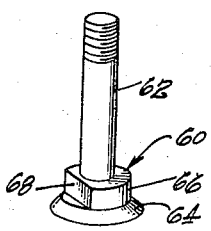
Figure 3 is a perspective view of a poppet utilized with the present invention.

A poppet 60, shown in Figures 2 and 3, has a stem 62 in sliding engagement with an appropriate opening in valve fitting 18, and has a frustro-conical head portion 64, which is adapted to seat against valve seat 58, as shown. Adjacent to head portion 64 is a cylindrical section 66, which is in sliding engagement with the cylindrical interior of fitting 18 to support and align the poppet. A portion of section 66 is cut away at 68 to provide for the passage of air past section 66.

The stem 62 is threaded to accommodate an adjustment nut 70 which retains a helical spring 72, the adjustment nut being secured against rotation by a lock nut 74. Spring 72, thus retained by adjustment nut 70, resiliently urges head portion 64 against valve seat 58, thus maintaining these valve parts in normally closed relation.

Adjustment nut 70 provides means for adjusting the tension of the spring 72.

In operation, the auxiliary air metering device of the present invention regulates the flow of auxiliary air to an internal combustion engine. The device regulates this flow in accordance with the pressure differential between the intake manifold of the engine and the exterior atmosphere. As is well known, the intake manifold pressure varies in accordance with engine speed, acceleration and deceleration. This pressure increases with acceleration and decreases with deceleration, and is proportional to acceleration or deceleration. Therefore, the pressure differential between the atmosphere and the manifold increases according to deceleration and decreases according to acceleration.

As hereinbefore described, spring 72 resiliently urges poppet head 64 against seat 58. The pressure differential between the atmosphere and the intake manifold acts upon the poppet head to urge it away from the seat 58. The tension of spring 72 is adjusted by means of adjustment nut 70 so that a predetermined lower pressure differential will initiate the separation of the poppet head and the seat 58. Spring 72 is selected to have a spring rate such that a predetermined higher pressure differential holds the poppet head in a fully open position. The predetermined lower pressure differential is selected to correspond to a predetermined high or maximum engine acceleration, and the predetermined higher differential is selected to correspond to a high or maximum deceleration of the engine.

With the engine operating at or above the predetermined high acceleration, poppet head 64 is seated against seat 58, and no auxiliary air is admitted to the air intake manifold. The only engine air is supplied through the carburetor. With proper carburetor adjustments, the intake mixture has the relatively high ratio of gasoline-to-air which it requires for the increased power output necessary for high acceleration. When the engine is rapidly decelerating, the intake manifold pressure drops to or below the pressure at which the predetermined higher pressure differential operates to hold the poppet head in a fully open position. A maximum of air is admitted through the device of this invention directly to manifold. The ratio of gasoline to air in the intake mixture is greatly reduced. The engine therefore decelerates smoothly and fuel is utilized more efficiently during deceleration. By admitting air directly to the manifold, pressure differential between the manifold and the atmosphere tends to equalize more rapidly, and less gasoline is introduced to the carburetor by the pressure differential.

The metering device provides proportional control of the auxiliary air supply between the predetermined high acceleration and the predetermined high deceleration. The device is therefore self-regulating to provide an efficient fuel-air mixture for all conditions of engine operation. When the engine is operating at a selected normal speed, such as that corresponding to the cruising velocity of an automobile, the poppet head is in a mid-position and admits a moderate amount of air to the intake manifold. This rate of air admission is adjusted coordinately with adjustments of the carburetor, for smooth and efficient operation.

When the engine is idling at a selected minimum speed, the air metering device admits air at a selected low rate. This air is in addition to that which is supplied through the carburetor. It is well known in the art that in internal combustion engines, particularly those of vehicles, tend to idle inefficiently irregularly because the fuel-air mixture is generally too rich. As is well known, this results because the carburetor adjustments are set for a selected cruising speed. The carburetor air valve being substantially closed during engine idle, and the adjustments being inappropriate, the fuel-air mixture is too rich with fuel and the engine idles irregularly, while exhausting considerable raw gasoline and unburned hydrocarbons. The auxiliary air supplied in proper proportion through the metering device of this invention insures smooth engine operation at idling speed and insures efficient fuel utilization.

From the foregoing description, it will be understood that the device of the present invention regulates the admission of auxiliary air to an internal combustion engine in accordance with need. It will be understood that the supplying of air in accordance with engine requirements at differing speeds and differing conditions of acceleration and deceleration, results in better engine performance, more efficient fuel utilization, a reduction in the exhaustion of gasoline and unburned hydrocarbons and in reduced position of carbon upon engine parts.

It has been found that the present invention is operative to reduce the probability of the blocking of fuel passages by the formation of fuel vapor therein. The device of this invention tends to prevent this "vapor-lock" because the auxiliary air admitted through the device tends to cool the engine parts adjacent to the fuel passages, thereby reducing the likelihood of the fuel attaining its vaporizing temperature.

Those versed in the art will realize that a number of modifications may be made in the construction shown without departing from the essential features of the present invention, and will understand that the basic principles of this invention are applicable to a wide variety of different structures. For example, various types of valve elements may be utilized, other than the particular forms hereinbefore shown and described. The device of this invention may be attached to the intake system of an engine at a location other than the one herein illustrated, and the device may be connected with the intake system by couplings, such as hose or tubing. As a further example, there may be provided an oil bath for filtering the air, instead of the fibrous material hereinbefore described.

Although specific embodiments of the present invention have been illustrated and described in detail, it is to be clearly understood that the same are by way of illustration and example only; it is to be understood that the invention is not limited thereto as many variations will be readily apparent to those versed in the art and the invention is to be given its broadest possible interpretation within the terms of the appended claims.

I claim:

1. An apparatus for supplying auxiliary air to a fuel-air mixture in the intake system of an internal combustion engine, said apparatus comprising a housing, filtering means in said housing for removing particles from auxiliary air passing therethrough, a valve fitting on said housing, said fitting communicating with said intake system at a point thereof between a carburetor and the cylinders of said engine, a valve seat on said valve fitting, a valve adapted for coaction with said valve seat, spring means for exerting predetermined force urging said valve towards said seat, said filtering means being positioned between said valve and the point of communication with said intake system, said valve being movable against said spring means in response to variations in pressure differential between said intake system and atmospheric pressure, thereby varying flow of auxiliary air to said intake system in response to variations in said pressure differential, whereby said fuel-air mixture is regulated to provide efficient mixture ratios for improved engine operation under varying conditions of engine speed, acceleration and deceleration.

2. An apparatus for supplying auxiliary air to a fuel-air mixture in the intake system of an internal combustion engine, said apparatus comprising a base threadedly secured in an opening in said intake system between a carburetor and the cylinders of said engine, said base having an opening therethrough, a head member attached to said base, means defining a chamber between the base and the head member, filtering means in said chamber for removing particles from air passing therethrough, a valve fitting formed integrally with said head member, said fitting having a frusto-conical valve seat defined thereon, a poppet slidably engaging said fitting and having a frusto-conical head portion adapted to coact with said valve seat, resilient means exerting predetermined force urging said head portion toward said valve seat, and means for adjusting said predetermined force exerted by said resilient means, said poppet head portion being movable in response to variations in pressure differential between said intake system and atmospheric pressure, thereby varying flow of auxiliary air to said intake system in response to variations in said pressure differential, whereby said fuel-air mixture is regulated to provide efficient mixture ratios for improved engine operation under varying conditions of engine speed, acceleration and deceleration.

3. An apparatus according to claim 2 and further including a bolt element for securing said head member to said base, said bolt element being in threaded engagement with said opening in said base and having a passage therethrough to provide communication between said opening and said chamber.

References Cited in the file of this patent

UNITED STATES PATENTS

| | | |
|---|---|---|
| 880,704 | Wood | Mar. 3, 1908 |
| 1,489,667 | Hamilton | Apr. 8, 1924 |
| 2,065,773 | Van Ranst | Dec. 29, 1936 |
| 2,281,287 | Hearn et al. | Apr. 28, 1942 |

FOREIGN PATENTS

| | | |
|---|---|---|
| 485,786 | Canada | Aug. 12, 1952 |